May 6, 1930. G. K. GARRETT 1,757,857
NONENTANGLING LOCK WASHER
Filed June 19, 1929
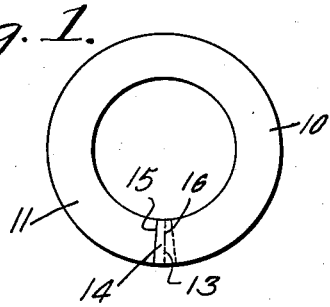
Fig. 1.
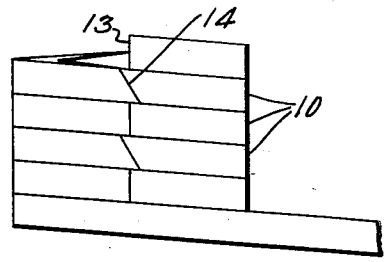
Fig. 4.
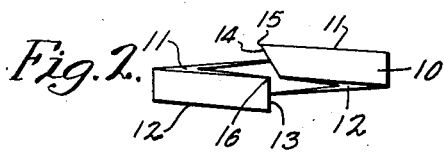
Fig. 2.
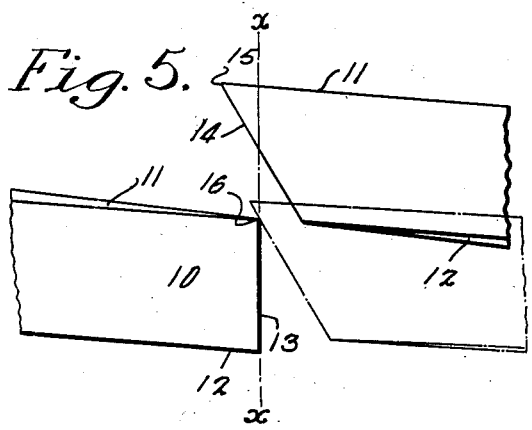
Fig. 5.
Fig. 3.
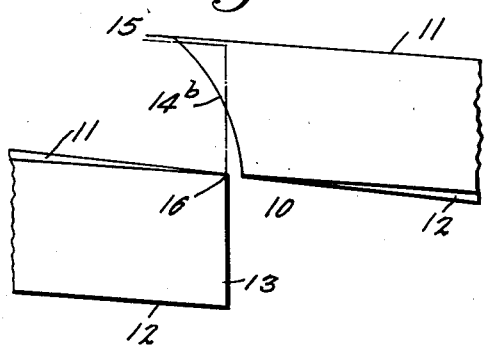
Fig. 7.
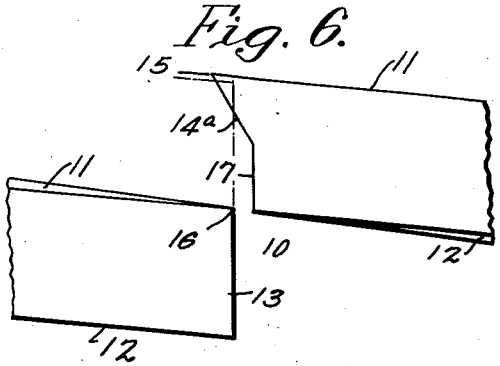
Fig. 6.
Inventor:
George K. Garrett.
By his Attorneys,
Howson & Howson Patented May 6, 1930

1,757,857

UNITED STATES PATENT OFFICE

GEORGE K. GARRETT, OF BRYN MAWR, PENNSYLVANIA, ASSIGNOR TO NATIONAL UMBRELLA FRAME COMPANY, OF PHILADELPHIA, PENNSYLVANIA, A CORPORATION OF PENNSYLVANIA

NONENTANGLING LOCK WASHER

Application filed June 19, 1929. Serial No. 372,122.

This invention relates to spring lock washers, and more particularly to lock washers of the type which are non-entangling.

An important object of the invention is the production of a device of this character which is capable of practical manufacture in all sizes. Lock washers for a considerable period have been manufactured by coiling a wire to produce a helix and then severing the several consecutive turns of the helix to produce the individual washers. For ease in manufacture the cut has been made along a line paralleling the axis of the helix so that end portions of the washer were substantially perpendicular to the upper and lower faces thereof, although it had been proposed to cut these faces at similar angles to the axis, and washers constructed in this latter manner were actually produced and employed in commerce. The advantage of cutting the washer upon an angle is that the overlapping of ends produced by this cutting tends to prevent entangling of the washers in handling in shipment if the spacing of these faces is kept within certain limits. However, in angularly cutting the ends of a washer, unless this is done in an extremely careful manner or the material employed in the construction of the washer is heavy, there is a tendency to spread or deflect the tips of the washers in the severing operation resulting in an opening in the washer between the ends thereof which permits ready entangling. This is particularly noticeable in washers of a size suitable for use with bolts of 3/8" diameter or under for such washers are usually constructed of material which is very thin in the direction of the axis of the helix and which, accordingly, has little resistance to displacement in that general direction.

Accordingly, an important object of the invention is to provide a construction incorporating the advantages obtainable with the angular type of cut but so constructed that undue axial deflection of the ends of the washer is avoided.

It will be obvious that with the angular type of cut there is also the possibility of disposition of the faces of the ends of the washer in such manner that there will be too great a contact between these angular faces with the result that the washer is circumferentially spread. This is not dangerous where the washer is of heavy construction but with smaller washers the circumferential spreading results in considerable breakage, for the material from which the washers is constructed is hard drawn steel wire and any weakness in the helix will result in the breakage if excessive spreading occurs.

Accordingly, a further object of the invention is the production of a washer having at one end a weakened area subjected to strains in operation of the washer, this weakened area being of a strength such that it will break to relieve tendency to circumferential spreading and thus prevent breakage of the washer and the destruction thereof as a practically functioning element.

Furthermore, where these ends are angularly cut the limit of separation of the angularly cut faces is the smallest diameter of the washer stock. This is extremely disadvantageous in the construction of washers for it limits the helical pitch and the possible expansion of the washer and, accordingly, increases the liability of this washer to take a "set" and become inoperative for the purpose for which it is intended. It is extremely desirable that the helical pitch of the washer, particularly in the smaller sizes, be made greater than the thickness of the material from which the washer stock is formed.

Accordingly, a still further object of the invention is the production of a washer in which the pitch of the helix comprising the washer bears no necessary relation to the thickness of the washer stock and in which, accordingly, a pitch may be employed insuring the operativeness of the washer under all conditions.

A further object of the invention is to provide a washer so constructed that it prevents interlocking and at the same time avoids material contact between the end faces of the washer during compression by reason of the fact that it is formed to accommodate itself to the natural movements of the washer stock during compression.

These and other objects I attain by the construction shown in the accompanying drawings wherein for the purpose of illustration, I have shown a preferred embodiment of my invention, and wherein:

Fig. 1 is a plan view of a washer constructed in accordance with my invention;

Fig. 2 is a side elevation thereof;

Fig. 3 is a fragmentary bottom plan view thereof;

Fig. 4 is a view showing the method of cutting the washers from a helix in which the washer stock is formed;

Fig. 5 is an enlarged front elevation illustrating the normal circumferential expansion of the helical washer when compressed;

Fig. 6 is a fragmentary side elevation of a slightly modified form of washer; and Fig. 7 is a similar view of a further modification.

Referring now to the drawings, and more particularly to Figs. 1 to 5 thereof, it will be noted that a washer constructed in accordance with my invention comprises a helical segment 10 one face of which indicated at 11 has a length greater than 360 degrees, and the opposite face of which indicated at 12, has a length less than 360 degrees. One end face 13 of the washer is radially sheared at an angle such that it is substantially perpendicular to the faces 11 and 12 while the opposite end face thereof is angularly cut as at 14, the angle cut being such that a plane including the end face 13 and indicated generally by the line x—x of Fig. 5 intersects the angularly cut face between the toe 15 formed between said face and face 11 of the washer and the center of the face 14. The washer is preferably originally constructed in such fashion that the helix would have a pitch approximating the smallest diameter of the washer stock which in the type of washer at present dealt with will be the thickness of the material in the direction of the axis of helix.

As hereinbefore stated, however, angular cutting of the faces causes a slight axial displacement of the end of the washer which is being so cut with the result that there is axial displacement of the end having face 14 increasing the opening between the face 14 and the junction between the face 11 and face 13 which is indicated at 16. End face 13 being cut parallel to the axis of the helix by radially applied force is not displaced axially so that over the type of washer having both ends bevelled the washer just described reduces abortive separation by fifty percent and the chances of the washer opening being excessive by at least ninety percent.

By approximating alignment of face 13 with the center of the face 14, considerable latitude is provided to compensate for accidental circumferential displacement of the cuts occurring through misalignment of the dies or breakage of the shearing faces thereof, as a slightly greater overlap of face 14 with respect to the perpendicular edge of face 13 will not render the washer ineffective, for reasons presently to appear. Lessening the overlap will not provide a gap permitting passage of the smallest diameter of the washer stock, which is represented by the edge face of the washers in washers of the type at present dealt with, unless this circumferential displacement were of such an extensive character that it would be immediately noticeable. For the same reasons the positioning of the faces as described allows considerable latitude for errors occurring through axial displacement of the ends of the washer resulting from inherent resiliency of the washer stock and its resulting natural tendency to change its position when severed from the remainder of the wire helix.

As is well known, any resilient helix has a tendency to spread circumferentially when flattened in the direction of its axis with the result that contact between face 14 and the corner 16 instead of occurring at the point at which the plane x—x intersects the face 14 in the normal position of the washer will occur at a point between this point and toe 15 very close to the toe, and there will be little if any tendency to circumferential spreading due to the action of the bevelled face upon this corner. If the elastic limit of the stock is reached or approached during spreading resulting from contact of face 14 with shoulder 16, then the forces resulting from axial movement of the nut engaged with the toe 15 will tend to break this toe over the shoulder provided by the corner 16 relieving the circumferential tension and preventing fracture of the washer at a point rendering it inoperative.

The circumferential spreading hereinbefore referred to does not noticeably occur at all times during the compression of the washer. As a matter of fact, there is no noticeable circumferential spreading of the helix until the washer has been compressed to a point where the compression forces exceed the resistance to circumferential spread. Therefore, during initial movement under compression relative movements of the ends are substantially axial to the helix following which there is a fairly sharp circumferential expansion. Therefore, to provide the overlapping bevelled faces and reduce the contact between these faces it is not necessary that the square cut face of the washer directly underly the center thereof, the angular pitch given the slantingly cut face need only extend through a portion of the width thereof as more clearly shown in the illustration of Fig. 6.

In this figure I have illustrated a washer wherein the bevelled portion of the face indicated at 14$^a$ is formed at the upper end of a perpendicularly cut end section 17. The structure of this figure is more easily and practically produced when, instead of forming the end cut with faces in angular relation, a curved cut 14$^b$ is formed as indicated in Fig. 7. Attention is directed to the fact that by the use of the square cut face 13 considerable difference can be made in the helical pitch without rendering the washer non-interlocking. The sole requirement to preserve this feature is that the angularly cut face 14, 14$^a$ or 14$^b$ shall be intersected by a plane including the end face 13 within a distance from the upper face of the washer stock at the end 13 which is less than the thickness of this washer stock in the direction of the axis of the washer. In practically every instance in the smaller sizes of washers where the increased pitch for the helix is necessary if an efficient washer is to be produced the thickness of the washer stock in the direction of the washer axis is the minimum diameter of the washer stock. Where this is not the case care must be taken that the minimum distance between the corner 16 and the other of the end faces of the washer is less than the minimum diameter of the washer stock. Complying with these two requirements it is impossible to produce washers which will interlock.

It will be obvious that a washer constructed in accordance with the foregoing has characteristics enabling the practical production of non-entangling washers in the smaller sizes and in those sizes wherein the washer stock is relatively thin in the general direction of the axis of the helix in which it is formed preparatory to the construction of washers therefrom. It will also be obvious that this construction may be modified to a certain extent without in any manner departing from the spirit of my invention, I accordingly do not limit myself to such specific structure as hereinbefore set forth except as hereinafter claimed.

I claim:

1. A lock washer comprising a helical segment having a pitch approximating the smallest diameter of the washer stock, one face of the washer being more than 360 degrees in circumference, the other face of the washer being less than 360 degrees in circumference.

2. A lock washer comprising a helical segment having a pitch approximately the smallest diameter of the washer stock, one face of the washer being more than 360 degrees in circumference, the other face of the washer being less than 360 degrees in circumference, one end of the segment having a radial face substantially perpendicular to the first-named faces of the washer.

3. A lock washer comprising a helical segment having a pitch approximating the smallest diameter of the washer stock, one face of the washer being more than 360 degrees in circumference, the other face of the washer being less than 360 degrees in circumference, one end of the segment having a radial face substantially perpendicular to the first-named faces of the washer, the other end face of the segment being angular and disposed in a general plane at an angle to the axis of the washer.

4. A washer comprising a helical segment having a pitch at least as great as the diameter of the washer stock, an end face of the segment being perpendicular to the upper and lower faces of the segment, the other end face of the segment having a tapered terminal overlapping the first-named face and spaced axially of the washer therefrom in alignment with said face a distance less than the thickness of said stock.

5. A lock washer comprising a helical segment having one end face thereof perpendicular to the upper and lower faces of the washer, the opposite end face of the washer being at an angle to the axis of the washer, said last-named end face lying in such a position as to be intersected within the thickness of the washer stock by the plane of the first-named end face produced in the direction of the axis of the washer.

GEORGE K. GARRETT.